US008699638B2

(12) United States Patent
Yi

(10) Patent No.: US 8,699,638 B2
(45) Date of Patent: Apr. 15, 2014

(54) METHOD AND DEVICE FOR IMPLEMENTING AUTOMATIC FREQUENCY CONTROL

(75) Inventor: Liqiang Yi, Shenzhen (CN)

(73) Assignee: ZTE Corporation, ShenZhen, Guangdong Province (CN)

( * ) Notice: Subject to any disclaimer, the term of this patent is extended or adjusted under 35 U.S.C. 154(b) by 11 days.

(21) Appl. No.: 13/380,614

(22) PCT Filed: Sep. 28, 2010

(86) PCT No.: PCT/CN2010/077391
§ 371 (c)(1),
(2), (4) Date: Dec. 23, 2011

(87) PCT Pub. No.: WO2011/091671
PCT Pub. Date: Aug. 4, 2011

(65) Prior Publication Data
US 2012/0288040 A1    Nov. 15, 2012

(30) Foreign Application Priority Data

Jan. 27, 2010  (CN) .......................... 2010 1 0103126

(51) Int. Cl.
*H03D 1/00*          (2006.01)
(52) U.S. Cl.
USPC ........... 375/343; 375/142; 375/143; 375/150; 375/152; 375/345; 375/344; 455/136; 455/137; 455/138; 455/164.2; 455/192.2; 455/234.1; 455/234.2; 455/164.1; 455/245.1

(58) Field of Classification Search
USPC ......... 375/142, 143, 150, 152, 345, 343, 344; 455/136, 137, 138, 164, 192.2, 234.1, 455/234.2, 164.1, 245.1, 164.2
See application file for complete search history.

(56) References Cited

U.S. PATENT DOCUMENTS

| 6,044,119 A | 3/2000 | Sato et al. |
| 7,443,826 B1 * | 10/2008 | Atarius et al. ................ 370/342 |
| 2008/0125070 A1 | 5/2008 | Grieco et al. |

FOREIGN PATENT DOCUMENTS

| CN | 1490962 A | 4/2004 |
| CN | 1588834 A | 3/2005 |
| CN | 1719815 A | 1/2006 |

OTHER PUBLICATIONS

International Search Report for PCT/CN2010/077391 dated Nov. 17, 2010.

* cited by examiner

*Primary Examiner* — Daniel Washburn
*Assistant Examiner* — Rahel Guarino
(74) *Attorney, Agent, or Firm* — Ling Wu; Stephen Yang; Ling and Yang Intellectual Property

(57) ABSTRACT

The present invention discloses a method for implementing automatic frequency control, and an apparatus thereof. The method discloses: calculating a correlation value of common pilot symbols in a reception signal of each path and a frequency offset value, calculating a combined frequency offset value according to the frequency offset value of each path, and determining, according to the combined frequency offset value, a frequency offset adjustment value for a voltage controlled oscillator, a frequency offset adjustment value for overall reception signals and a frequency offset adjustment value for the reception signal of each path. The present invention selects a method of small-scope frequency offset estimation, which makes frequency offset estimation more accurate.

18 Claims, 3 Drawing Sheets

METHOD AND DEVICE FOR IMPLEMENTING AUTOMATIC FREQUENCY CONTROL

TECHNICAL FILED

The present invention relates to the field of wireless communication, and in particular, to a method and an apparatus for implementing automatic frequency control.

BACKGROUND OF THE RELATED ART

In a Wideband Code Division Multiple Access (WCDMA) system, there is generally carrier frequency difference, which is also called as frequency offset, between a base station and a terminal due to the influence of the accuracy and stability of a local crystal oscillator, and Doppler effect during the process of movement of the mobile terminal. Such frequency offset will have huge influence on the demodulation performance of the terminal. Automatic Frequency Control (AFC) is widely used in the system as an efficient method for correcting and controlling frequency offset. However, the existing method is very simple for Automatic Frequency Control in the WCDMA system, and lacks comprehensive consideration for the system; meanwhile, the frequency offset compensation algorithm adopts a conventional table lookup method or triangular transformation method, which has a big consumption of hardware.

SUMMARY OF THE INVENTION

The present invention provides a method and an apparatus for implementing automatic frequency control to improve the accuracy, efficiency and stability of frequency offset control.

In order to solve the above problem, the present invention provides a method for implementing automatic frequency control, comprising the following steps of: calculating a correlation value of common pilot symbols in a reception signal of each path and a frequency offset value, calculating and obtaining a combined frequency offset value according to the frequency offset value of the reception signal of each path, and determining, according to the combined frequency offset value, a frequency offset adjustment value for a voltage controlled oscillator, a frequency offset adjustment value for overall reception signals and a frequency offset adjustment value for the reception signal of each path.

The step of calculating a correlation value of common pilot symbols in a reception signal of each path and a frequency offset value may comprise: performing a correlation calculation on a plurality of common pilot symbols received in a timeslot for the reception signal of each path to obtain the correlation value, wherein a symbol number L spaced between two symbols on which the correlation calculation is performed is an integer greater than or equal to 2; and, calculating the frequency offset value corresponding to the correlation value according to the correlation value and the symbol number L.

The step of calculating and obtaining a combined frequency offset value according to the frequency offset value of the reception signal of each path may comprise: judging whether the frequency offset value of the reception signal of each path is valid according to a signal-to-interference ratio threshold of the reception signal of each path, weighted combining the valid frequency offset values to obtain the combined frequency offset value, wherein a weighted parameter of the frequency offset value of the reception signal of each path is determined by a proportion of a common pilot symbol signal-to-interference ratio corresponding to the frequency offset value to a sum of common pilot symbol signal-to-interference ratios of various paths. This method may further comprise: filtering the combined frequency offset value with a low-pass filter, and adjusting a value of a filtering coefficient used by the low-pass filter according to an adjusting stage.

The frequency offset adjustment value for the voltage controlled oscillator may be determined by adjusting and controlling the combined frequency offset value in the following way:

$$\overline{\Delta f}_{VCO}^{cur} = \begin{cases} 0 & |\overline{\Delta f}^{cur}| \leq F \\ \alpha \overline{\Delta f}^{cur} & |\overline{\Delta f}^{cur}| > F, \text{ and } \\ & |\overline{\Delta f}^{cur} - \overline{\Delta f}^{pre}| \leq \kappa |\overline{\Delta f}^{pre}|; \\ \overline{\Delta f}_{VCO}^{pre} + \beta(\overline{\Delta f}^{cur} - \overline{\Delta f}_{VCO}^{pre}) & |\overline{\Delta f}^{cur}| > F, \text{ and } \\ & |\overline{\Delta f}^{cur} - \overline{\Delta f}^{pre}| > \kappa |\overline{\Delta f}^{pre}| \end{cases}$$

wherein, $F, \alpha, \beta, \kappa$ represents an adjusting and controlling parameter, $\overline{\Delta f}^{cur}$ is a combined frequency offset value in a process of the current frequency offset adjustment, $\overline{\Delta f}^{pre}$ is a combined frequency offset value in a process of the previous frequency offset adjustment, $\overline{\Delta f}_{VCO}^{cur}$ is a frequency offset adjustment value for the voltage controlled oscillator in the process of the current frequency offset adjustment, and $\overline{\Delta f}_{VCO}^{pre}$ is a frequency offset adjustment value for the voltage controlled oscillator in the process of the previous frequency offset adjustment.

The frequency offset adjustment value for the overall reception signals may be determined as $\overline{\Delta f}^{cur} - \overline{\Delta f}_{VCO}^{cur}$, the frequency offset adjustment value for the reception signal of each path may be determined as $\Delta f_i - \overline{\Delta f}^{cur}$, $\Delta f_i$ is the frequency offset value of the reception signal of path i. This method may further comprise: performing a frequency offset compensation according to a phase angle corresponding to the determined frequency offset adjustment value and a Coordinate Rotation Digital Computer algorithm.

The present invention further provides an apparatus for implementing automatic frequency control, comprising a correlation calculation module and a frequency offset calculation module that are connected with each other, wherein the correlation calculation module is configured to calculate a correlation value of common pilot symbols in a reception signal of each path; and the frequency offset calculation module is configured to calculate a frequency offset value of a reception signal of each path; wherein the apparatus further comprises a frequency offset adjustment and control module that is connected with the frequency, offset calculation module; the frequency offset adjustment and control module is configured to calculate and obtain a combined frequency offset value according to the frequency offset value of the reception signal of each path, and determine, according to the combined frequency offset value, a frequency offset adjustment value for a voltage controlled oscillator, a frequency offset adjustment value of overall reception signals and a frequency offset adjustment value for the reception signal of each path.

The correlation calculation module is configured to calculate the correlation value of common pilot symbols in the reception signal of each path in the following way: performing a correlation calculation on a plurality of common pilot symbols received in a timeslot for the reception signal of each path to obtain the correlation value, wherein a symbol number L spaced between two symbols on which the correlation calculation is performed is an integer greater than or equal to 2; the frequency offset calculation module is configured to calculate the frequency offset value of the reception signal of each path in the following way: calculating the frequency offset value corresponding to the correlation value according to the correlation value and the symbol number L calculated by the correlation calculation module.

The frequency offset adjustment and control module is configured to calculate and obtain the combined frequency offset value in the following way: judging whether the frequency offset value of the reception signal of each path is valid according to a signal-to-interference ratio threshold of the reception signal of each path, weighted combining the valid frequency offset values to obtain the combined frequency offset value, wherein a weighted parameter of the frequency offset value of the reception signal of each path is determined by a proportion of a common pilot symbol signal-to-interference ratio corresponding to the frequency offset value to a sum of common pilot symbol signal-to-interference ratios of various paths. The frequency offset adjustment and control module is further configured to filter the combined frequency offset value with a low-pass filter, and adjust a value of a filtering coefficient used by the low-pass filter according to an adjusting stage.

The frequency offset adjustment and control module is configured to determine the frequency offset adjustment value for the voltage controlled oscillator by adjusting and controlling the combined frequency offset value in the following way:

$$\overline{\Delta f}_{VCO}^{cur} = \begin{cases} 0 & |\overline{\Delta f}^{cur}| \le F \\ \alpha \overline{\Delta f}^{cur} & |\overline{\Delta f}^{cur}| > F, \text{ and} \\ & |\overline{\Delta f}^{cur} - \overline{\Delta f}^{pre}| \le \kappa|\overline{\Delta f}^{pre}|; \\ \overline{\Delta f}_{VCO}^{pre} + \beta(\overline{\Delta f}^{cur} - \overline{\Delta f}_{VCO}^{pre}) & |\overline{\Delta f}^{cur}| > F, \text{ and} \\ & |\overline{\Delta f}^{cur} - \overline{\Delta f}^{pre}| > \kappa|\overline{\Delta f}^{pre}| \end{cases}$$

wherein, F,α,β,κ represents an adjusting and controlling parameter, $\overline{\Delta f}^{cur}$ is a combined frequency offset value in a process of the current frequency offset adjustment, $\overline{\Delta f}^{pre}$ is a combined frequency offset value in a process of the previous frequency offset adjustment, $\overline{\Delta f}_{VCO}^{cur}$ is a frequency offset adjustment value for the voltage controlled oscillator in the process of the current frequency offset adjustment, and $\overline{\Delta f}_{VCO}^{pre}$ is a frequency offset adjustment value for the voltage controlled oscillator in the process of the previous frequency offset adjustment. The frequency offset adjustment and control module is configured to: determine the frequency offset adjustment value for the overall reception signals as $\overline{\Delta f}^{cur} - \overline{\Delta f}_{VCO}^{cur}$; and determine the frequency offset adjustment value for the reception signal of each path as $\Delta f_i - \overline{\Delta f}^{cur}$, wherein, $\Delta f_i$ is the frequency offset value of the reception signal of path i.

The apparatus may further comprise a frequency offset compensation module, which is configured to perform a frequency offset compensation according to a phase angle corresponding to the frequency offset adjustment value determined by the frequency offset adjustment and control module and a coordinate rotation digital computer algorithm.

Compared with prior art, with the method and apparatus of the present invention, a new method of small-scope frequency offset estimation is selected, which makes frequency offset estimation more accurate; by using Coordinate Rotation Digital Computer (CORDIC) algorithm, hardware resources are saved and calculation accuracy is improved; frequency offset adjustment and control policy enables radio frequency adjustment to be more gentle and the stability of the system to be enhanced.

PREFERRED EMBODIMENTS OF THE INVENTION

Figure 1:
FIG. 1 is a structure diagram of an apparatus for implementing automatic frequency control.

As shown in FIG. 1, the apparatus for implementing automatic frequency control includes a correlation calculation module, a frequency offset calculation module, a frequency offset adjustment and control module, and a frequency offset compensation module that are connected in turn.

Functions of each module will be described respectively.

(1) a correlation calculation module is used to extract common pilot symbols in the reception signal of each path, calculate the correlation value of the common pilot symbols in the reception signal of each path; specifically, for the signal of each path, perform a correlation calculation on a plurality of common pilot symbols received in a timeslot to obtain the correlation value. The calculating method will be described as follows:

Supposing that the CPICH symbol received by the correlation calculation module is S(t), the correlation calculation may be performed on part of the pilot symbols in a common pilot channel (CPICH) received in one timeslot in order to eliminate the impact of the space-time transmit diversity (STTD) transmitting pattern, thereby achieving the purpose of eliminating the impact of the channel through the correlation between symbols, for example, the correlation calculation is only performed on the first symbol to the eighth symbol.

The correlation calculation mode between the symbols relates to the range and accuracy of a frequency offset estimation result, including a large-range frequency offset estimation and a small-range frequency offset estimation. The large-range frequency offset estimation has a low precision and is applicable to a frequency offset capture state; while the small-range frequency offset estimation has a high precision and is applicable to a frequency offset tracking state. The frequency offset capture state is generally implemented inside an initial cell searching module. In a Rake receiver, it mainly regards to the frequency offset tracking adjustment after undergoing initial frequency offset capture and compensation.

Figure 2A:
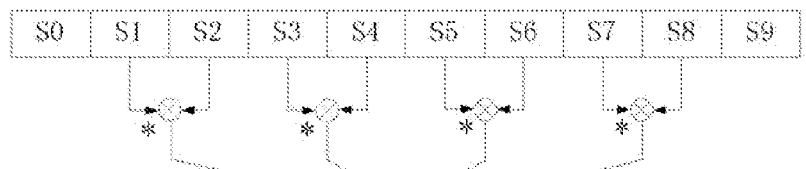
FIG. 2A is a structure diagram one of a correlation calculation of frequency offset estimation.

With regard to an estimation method relating to a larger range of frequency offset, the calculation of the correlation value C is as shown in FIG. 2A and the following formula:

$$C = \frac{1}{4}\sum_{i=1}^{4} S_{2i-1}^* S_{2i}$$

Figure 2B:
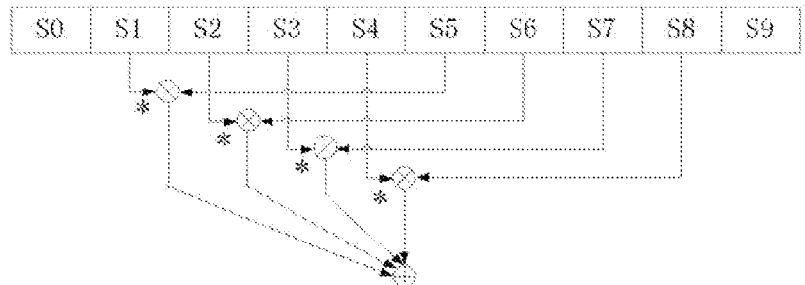
FIG. 2B is a structure diagram two of a correlation calculation of frequency offset estimation.

With regard to the estimation relating to a smaller range of frequency offset, the symbol number L spaced between the two symbols on which the correlation calculation is performed is an integer greater than or equal to 2; a mode one taking the value of L as 4 is as shown in FIG. 2B and the following formula:

$$C = \frac{1}{4}\sum_{i=1}^{4} S_i^* S_{i+4}$$

Figure 2C:
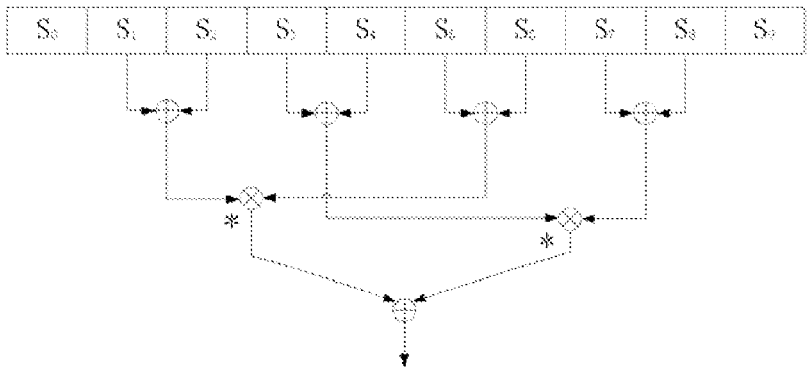
FIG. 2C is a structure diagram three of a correlation calculation of frequency offset estimation.

A mode two taking the value of L as 4 is as shown in FIG. 2C and the following formula:

$$C = \left(\frac{S_1 + S_2}{2}\right)^*\left(\frac{S_5 + S_6}{2}\right) + \left(\frac{S_3 + S_4}{2}\right)^*\left(\frac{S_7 + S_8}{2}\right)$$

In addition, considering the reason that the influence of noise is too big when performing frequency offset estimation for correlation of the CPICH symbols of a single timeslot, the correlation values of several timeslots may also be added and averaged to weaken the influence.

(2) The frequency offset calculation module is used to calculate the frequency offset value of the reception signal of each path;

the frequency offset calculation module is further used to calculate the frequency offset value corresponding to the correlation value according to the correlation value output by the correlation calculation module and the value of L used in the correlation calculation.

The specific calculating method is as shown in the following formula:

$$\Delta\omega = \frac{1}{TL}\arctan\left(\frac{\text{Im}(C)}{\text{Re}(C)}\right)$$

wherein, L is the symbol number spaced between the two symbols on which the correlation calculation is performed; T is the duration time of a unit symbol, which is 1/15000. Furthermore, the obtained frequency offset is:

$$\Delta f = \frac{\Delta\omega}{2\pi} = \frac{7500}{\pi L}\arctan\left(\frac{\text{Im}(C)}{\text{Re}(C)}\right)$$

It can be seen from the above formula that the calculating range of the frequency offset is determined by L. For example: when L is 1, the measured frequency offset limit is ±7.5 KHz with a large range of frequency offset estimation but a limited estimation accuracy, and thus is applicable to the initial frequency offset capture and can be applied in the initial cell searching module. When L is 4, the measured frequency offset limit is ±1.75 KHz with a high estimation accuracy and can meet the requirement for estimation range of Doppler frequency offset caused by high-speed movement, and thus is applicable to the frequency offset tracking and adjusting state. The present invention relates to the precise AFC adjustment in the Rake after undergoing the initial frequency offset adjustment. The AFC control with different accuracies and ranges can be achieved in the WCDMA system through calculation by selecting a suitable correlation module.

(3) The frequency offset adjustment and control module is used to calculate and obtain a combined frequency offset value according to the frequency offset value of the reception signal of each path, and determine, according to the combined frequency offset value, a frequency offset adjustment value for a voltage controlled oscillator, a frequency offset adjustment value of overall reception signals (i.e., the overall received I, Q data) and a frequency offset adjustment value for the reception signal of each path.

Figure 3:
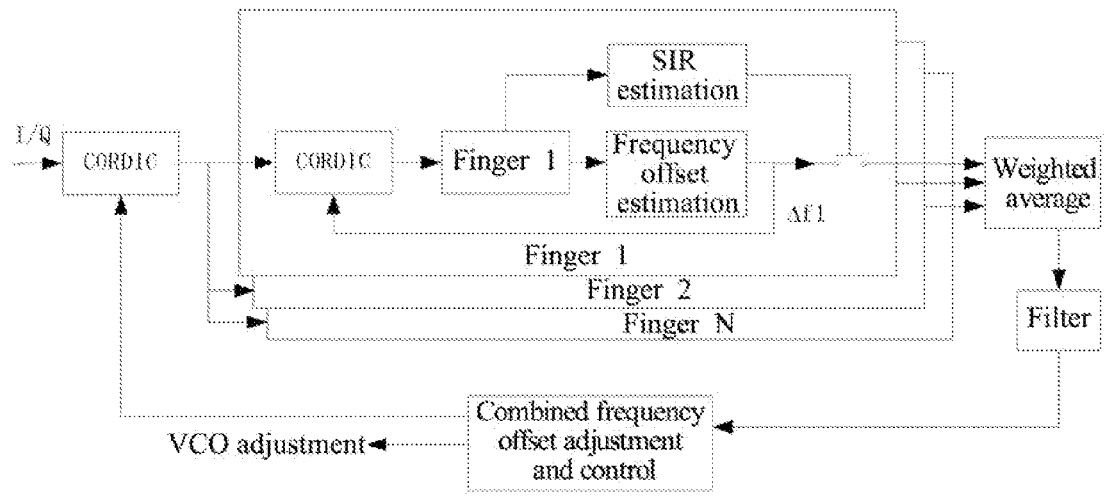
FIG. 3 is an overall scheme one of AFC in a Rake receiver.
Figure 4:
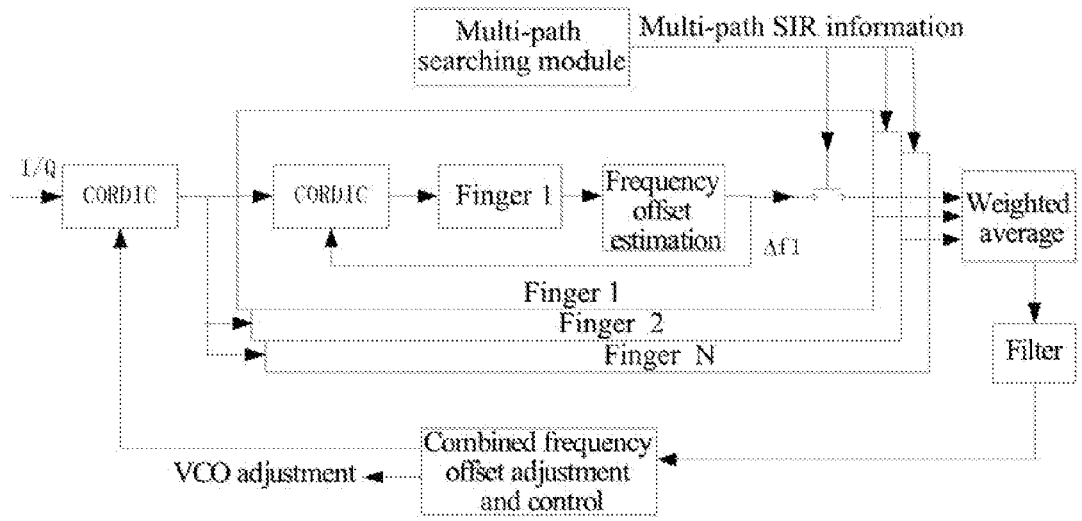
FIG. 4 is an overall scheme two of AFC in a Rake receiver.

The frequency offset adjustment and control module judges whether the frequency offset value of the signal of each path is valid according to a signal-to-interference ratio (SIR) threshold of the signal of each path to eliminate the invalid frequency offset values. Herein, the SIR threshold may be estimated according to the received CPICH symbols as shown in FIG. 3, or may be directly provided by the multi-path searching module in the system as shown In FIG. 4.

The frequency offset adjustment and control module weighted combines the valid frequency offset values to obtain the combined frequency offset value according to a formula as shown below:

$$\overline{\Delta f} = \sum_{i=0}^{N-1} w_i \cdot \Delta f_i;$$

wherein, $w_0+w_1+ \ldots +w_{N-1}=1$, $\Delta f_i$ refers to the $i^{th}$ valid frequency offset value. The weighted parameter of the frequency offset value of the signal of each path is determined by the proportion of the corresponding common pilot symbol SIR to a sum of common pilot symbol SIRs of various paths. If $SIR_i$ denotes the SIR of finger i, then, $$w_i = \frac{SIR_i}{\sum_{i=0}^{M-1} SIR_i} \text{ and } SIR_i > \lambda$$

wherein, λ is a control threshold (M is the number of the valid paths that exceed the threshold).

Next, the adjustment and control module uses a low-pass filter, which may be a first order infinite impulse response (IIR) low-pass filter, to filter the combined frequency offset value, and adjusts its filtering coefficient according to different adjusting stages. For example, a larger filtering coefficient, e.g., ½, is initially selected, and after several adjusting cycles, a smaller filtering coefficient, e.g., ¼, is selected; the purpose is to enable the filtering effect to rapidly follow the current frequency offset value at the beginning of adjustment, and have a good filtering action after following.

Next, adjustment on the frequency offset value by the frequency offset adjustment and control module is divided into three parts:

1) Frequency Offset Compensation for the Voltage Controlled Oscillator (VCO)

The combined frequency offset value is adjusted and controlled in the following way:

$$\overline{\Delta f}_{VCO}^{cur} = \begin{cases} 0 & |\overline{\Delta f}^{cur}| \leq F \\ \alpha \overline{\Delta f}^{cur} & |\overline{\Delta f}^{cur}| > F, \text{ and } |\overline{\Delta f}^{cur} - \overline{\Delta f}^{pre}| \leq \kappa |\overline{\Delta f}^{pre}|; \\ \overline{\Delta f}_{VCO}^{pre} + \beta(\overline{\Delta f}^{cur} - \overline{\Delta f}_{VCO}^{pre}) & |\overline{\Delta f}^{cur}| > F, \text{ and } |\overline{\Delta f}^{cur} - \overline{\Delta f}^{pre}| > \kappa |\overline{\Delta f}^{pre}| \end{cases}$$

F,α,β,κ are adjusting and controlling parameters, F is a frequency value set by the system, α and β are real numbers greater than 0 and smaller than 1, and κ is a real number greater than 0. Generally, the value of F is 50 Hz, α is ½, β is ¼, and κ is 2. $\overline{\Delta f}^{cur}$ is the combined frequency offset value in the process of current frequency offset adjustment, $\overline{\Delta f}^{pre}$ is the combined frequency offset value in the process of previous frequency offset adjustment, $\overline{\Delta f}_{VCO}^{cur}$ is the frequency offset adjustment value for the voltage controlled oscillator in the process of current frequency offset adjustment, and $\overline{\Delta f}_{VCO}^{pre}$ is the frequency offset adjustment value for the voltage controlled oscillator in the process of previous frequency offset adjustment.

2) Frequency Offset Compensation for Overall Reception Signals

It is acquired from the combined frequency offset vale and the VCO frequency offset adjustment value that the frequency offset compensation value for the overall reception signals is $\overline{\Delta f}^{cur} - \overline{\Delta f}_{VCO}^{cur}$, which is compensated by using a CORDIC algorithm in the frequency offset compensation module.

3) Frequency Offset Compensation for the Reception Signal of Each Path

The reception signal of each path is compensated using the CORDIC algorithm, i.e., the internal frequency offset of finger (finger refers to the finger in the RAKE receiver, and each finger in the RAKE receiver is responsible for receiving and tracking each multi-path signal) is compensated, and the frequency offset compensation value is the difference between the frequency offset value of each path and the combined frequency offset adjustment value, i.e., $\Delta f_i - \overline{\Delta f}^{cur}$, wherein, $\Delta f_i$ is the frequency offset value of path i, i is an integer greater than or equal to 0 and smaller than or equal to N−1, and N is the number of fingers, thereby achieving rapid and fine compensation for residual frequency offset inside the finger.

(4) The frequency offset compensation module is used to perform frequency offset compensation according to a phase angle corresponding to the frequency offset adjustment value and a Coordinate Rotation Digital Computer algorithm.

If the input reception signal is indicated as x+jy, then performing the frequency offset compensation obtains:

$$Z_{de\_rot} = x \cos\phi - y \sin\phi + j(y \cos\phi + x \sin\phi)$$

here, φ is the phase rotation amount of frequency offset compensation of reception signal samples, and its value is calculated through 2πfΔt, wherein Δt is the time interval between the signal samples; f is the calculated frequency offset compensation value. It can be seen from above that, the value for overall input signals is an aggregate-value of frequency offset adjustment $\overline{\Delta f}^{cur} - \overline{\Delta f}_{VCO}^{cur}$ after AFC is initiated, and the value for the reception signal of each path is an aggregate-value of frequency offset adjustment $\Delta f_i - \overline{\Delta f}^{cur}$ after AFC is initiated. With regard to the processing of the above formula, the conventional method adopts a table lookup algorithm or triangular transformation method, which only has limited precision in view of expense of resources. The present invention is implemented by using the CORDIC (Coordinate Rotation Digital Computer) algorithm, which is featured in simple implementation, low expense of resources and high accuracy. The specific algorithm is as follows:

$$\begin{bmatrix} x_{i+1} \\ y_{i+1} \end{bmatrix} = \left\{ \prod_{i=0}^{b-1} \frac{1}{\sqrt{1+2^{-2i}}} \right\} \begin{bmatrix} 1 & -\sigma_i 2^{-i} \\ \sigma_i 2^{-i} & 1 \end{bmatrix} \cdot \begin{bmatrix} x_i \\ y_i \end{bmatrix}$$

$$z_{i+1} = z_i - \sigma_i \arctan(2^{-i})$$

The number of times of iteration is generally determined by the calculation accuracy, and can be quantified to a definite value.

Figure 5:
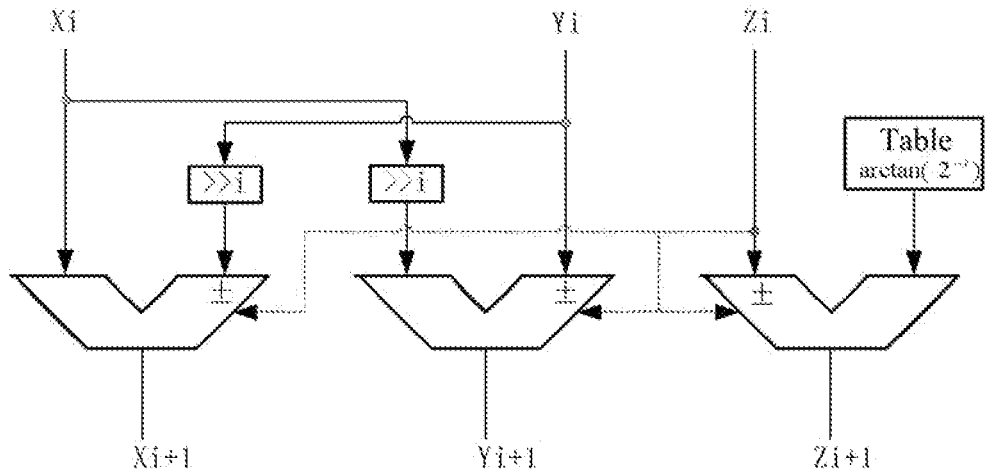
FIG. 5 is a pipeline structure diagram for implementing a CORDIC algorithm.

In the above algorithm, $x_0 = x$, $y_0 = y$, $z_0 = \phi$, $$\sigma_i = \text{sign}\left[\varphi - \sum_i \varphi_i\right],$$

i is the iteration sequence, and the value output by the final iteration is precisely the value obtained by the reception signal data through frequency offset compensation. For the amplitude factor $$K_b = \prod_{i=0}^{b-1} \frac{1}{\sqrt{1+2^{-2i}}},$$

it is a constant when the number of times of iteration b is sufficient, and it can be also converted into constant shift and addition operation. In the process of implementing the CORDIC, it can be totally implemented by using a pipeline structure of the shift and addition operation, which is highly efficient and can be easily implemented. The pipeline unit structure for implementing the CORDIC is as shown in FIG. 5.

Figure 6:
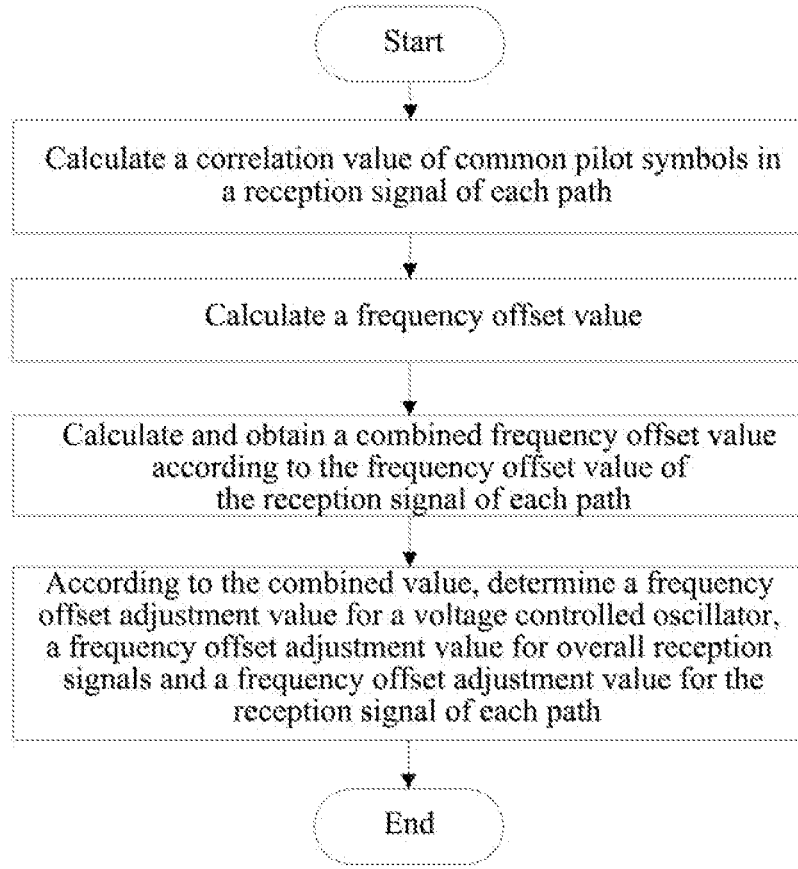
FIG. 6 is a flow chart of a method for implementing automatic frequency control.

As shown in FIG. 6, the method for implementing automatic frequency control comprises: calculating a correlation value of common pilot symbols in a reception signal of each path and a frequency offset value, calculating and obtaining a combined frequency offset value according to the frequency offset value of the reception signal of each path, and determining, according to the combined frequency offset value, a frequency offset adjustment value for a voltage controlled oscillator, a frequency offset adjustment value of overall reception signals (i.e., overall received I, Q data) and a frequency offset adjustment value for the reception signal of each path.

The implementation order of the above method is the same with the flow of the correlation calculation module, the frequency offset calculation module, the frequency offset adjustment and control module and the frequency offset compensation module in the above description on the apparatus performing the corresponding functions in sequence, the specific implementing method corresponds to the functions of the modules, and thus will not be described here.

The above embodiments are only preferred embodiments of the present invention, and they are not intended to limit the present invention. For a person having ordinary skills in the art, the present invention may have various modifications and variations. Any modification, equivalent, improvement and so on made within the sprit and principle of the present invention shall be within the protection scope of the present invention.

INDUSTRIAL APPLICABILITY

Compared with the prior art, the present invention has the following beneficial effects: frequency offset estimation is more accurate; hardware resources are saved and calculation accuracy is improved; and the stability of the system is enhanced.

What is claimed is:

1. A method for implementing automatic frequency control, comprising the following steps of:
calculating a correlation value of common pilot symbols in a reception signal of each path and a frequency offset value;
calculating and obtaining a combined frequency offset value according to the frequency offset value of the reception signal of each path; and
according to the combined frequency offset value, determining a frequency offset adjustment value for a voltage controlled oscillator, a frequency offset adjustment value for overall reception signals and a frequency offset adjustment value for the reception signal of each path;
wherein, the step of calculating a correlation value of common pilot symbols in a reception signal of each path and a frequency offset value comprises:
performing a correlation calculation on a plurality of common pilot symbols received in a timeslot for the reception signal of each path to obtain the correlation value, wherein a symbol number L spaced between two symbols on which the correlation calculation is performed is an integer greater than or equal to 2; and,
calculating the frequency offset value corresponding to the correlation value according to the correlation value and the symbol number L.

2. The method according to claim 1, wherein, the step of calculating and obtaining a combined frequency offset value according to the frequency offset value of the reception signal of each path comprises:
judging whether the frequency offset value of the reception signal of each path is valid according to a signal-to-interference ratio threshold of the reception signal of each path, weighted combining the valid frequency offset values to obtain the combined frequency offset value, wherein a weighted parameter of the frequency offset value of the reception signal of each path is determined by a proportion of a common pilot symbol signal-to-interference ratio corresponding to the frequency offset value to a sum of common pilot symbol signal-to-interference ratios of various paths.

3. The method according to claim 2, further comprising: filtering the combined frequency offset value with a low-pass filter, and adjusting a value of a filtering coefficient used by the low-pass filter according to an adjusting stage.

4. The method according to claim 1, wherein, the frequency offset adjustment value for the voltage controlled oscillator is determined by adjusting and controlling the combined frequency offset value in the following way:

$$\overline{\Delta f}_{VCO}^{cur} = \begin{cases} 0 & |\overline{\Delta f}^{cur}| \le F \\ \alpha \overline{\Delta f}^{cur} & |\overline{\Delta f}^{cur}| > F, \text{ and } |\overline{\Delta f}^{cur} - \overline{\Delta f}^{pre}| \le \kappa |\overline{\Delta f}^{pre}|; \\ \overline{\Delta f}_{VCO}^{pre} + \beta(\overline{\Delta f}^{cur} - \overline{\Delta f}_{VCO}^{pre}) & |\overline{\Delta f}^{cur}| > F, \text{ and } |\overline{\Delta f}^{cur} - \overline{\Delta f}^{pre}| > \kappa |\overline{\Delta f}^{pre}| \end{cases}$$

wherein, $F, \alpha, \beta, \kappa$ represents an adjusting and controlling parameter, $\overline{\Delta f}^{cur}$ is a combined frequency offset value in a process of the current frequency offset adjustment, $\overline{\Delta f}^{pre}$ is a combined frequency offset value in a process of the previous frequency offset adjustment, $\overline{\Delta f}_{VCO}^{cur}$ is a frequency offset adjustment value for the voltage controlled oscillator in the process of the current frequency offset adjustment, and $\overline{\Delta f}_{VCO}^{pre}$ is a frequency offset adjustment value for the voltage controlled oscillator in the process of the previous frequency offset adjustment.

5. The method according to claim 4, wherein,
the frequency offset adjustment value for the overall reception signals is determined as $\overline{\Delta f}^{cur} - \overline{\Delta f}_{VCO}^{cur}$;
the frequency offset adjustment value for the reception signal of each path is determined as $\Delta f_i - \overline{\Delta f}^{cur}$, wherein, $\Delta f_i$ is the frequency offset value of the reception signal of path i.

6. The method according to claim 5, further comprising: performing a frequency offset compensation according to a phase angle corresponding to the determined frequency offset adjustment value and a coordinate rotation digital computer algorithm.

7. The method according to claim 3, wherein, the frequency offset adjustment value for the voltage controlled oscillator is determined by adjusting and controlling the combined frequency offset value in the following way:

$$\overline{\Delta f}_{VCO}^{cur} = \begin{cases} 0 & |\overline{\Delta f}^{cur}| \le F \\ \alpha \overline{\Delta f}^{cur} & |\overline{\Delta f}^{cur}| > F, \text{ and } |\overline{\Delta f}^{cur} - \overline{\Delta f}^{pre}| \le \kappa |\overline{\Delta f}^{pre}|; \\ \overline{\Delta f}_{VCO}^{pre} + \beta(\overline{\Delta f}^{cur} - \overline{\Delta f}_{VCO}^{pre}) & |\overline{\Delta f}^{cur}| > F, \text{ and } |\overline{\Delta f}^{cur} - \overline{\Delta f}^{pre}| > \kappa |\overline{\Delta f}^{pre}| \end{cases}$$

wherein, $F, \alpha, \beta, \kappa$ represents an adjusting and controlling parameter, $\overline{\Delta f}^{cur}$ is a combined frequency offset value in a process of the current frequency offset adjustment, $\overline{\Delta f}^{pre}$ is a combined frequency offset value in a process of the previous frequency offset adjustment, $\overline{\Delta f}_{VCO}^{cur}$ is a frequency offset adjustment value for the voltage controlled oscillator in the process of the current frequency offset adjustment, and $\overline{\Delta f}_{VCO}^{pre}$ is a frequency offset adjustment value for the voltage controlled oscillator in the process of the previous frequency offset adjustment.

8. The method according to claim 7, wherein,
the frequency offset adjustment value for the overall reception signals is determined as $\overline{\Delta f}^{cur} - \overline{\Delta f}_{VCO}^{cur}$;
the frequency offset adjustment value for the reception signal of each path is determined as $\Delta f_i - \overline{\Delta f}^{cur}$, wherein, $\Delta f_i$ is the frequency offset value of the reception signal of path i.

9. The method according to claim 8, further comprising: performing a frequency offset compensation according to a phase angle corresponding to the determined frequency offset adjustment value and a coordinate rotation digital computer algorithm.

10. An apparatus for implementing automatic frequency control, comprising a correlation calculation module and a frequency offset calculation module that are connected with each other, and a frequency offset adjustment and control module that is connected with the frequency offset calculation module; wherein, the correlation calculation module is configured to calculate a correlation value of common pilot symbols in a reception signal of each path;

the frequency offset calculation module is configured to calculate a frequency offset value of a reception signal of each path; and the frequency offset adjustment and control module is configured to calculate and obtain a combined frequency offset value according to the frequency offset value of the reception signal of each path, and according to the combined frequency offset value, determine a frequency offset adjustment value for a voltage controlled oscillator, a frequency offset adjustment value of overall reception signals and a frequency offset adjustment value for the reception signal of each path;

wherein, the correlation calculation module is configured to calculate the correlation value of common pilot symbols in the reception signal of each path in the following way: performing a correlation calculation on a plurality of common pilot symbols received in a timeslot for the reception signal of each path to obtain the correlation value, wherein a symbol number L spaced between two symbols on which the correlation calculation is performed is an integer greater than or equal to 2;

the frequency offset calculation module is configured to calculate the frequency offset value of the reception signal of each path in the following way: calculating the frequency offset value corresponding to the correlation value according to the correlation value and the symbol number L calculated by the correlation calculation module.

11. The apparatus according to claim 10, wherein, the frequency offset adjustment and control module is configured to calculate and obtain the combined frequency offset value in the following way:

judging whether the frequency offset value of the reception signal of each path is valid according to a signal-to-interference ratio threshold of the reception signal of each path, weighted combining the valid frequency offset values to obtain the combined frequency offset value, wherein a weighted parameter of the frequency offset value of the reception signal of each path is determined by a proportion of a common pilot symbol signal-to-interference ratio corresponding to the frequency offset value to a sum of common pilot symbol signal-to-interference ratios of various paths.

12. The apparatus according to claim 11, wherein, the frequency offset adjustment and control module is further configured to filter the combined frequency offset value with a low-pass filter, and adjust a value of a filtering coefficient used by the low-pass filter according to an adjusting stage.

13. The apparatus according to claim 10, wherein, the frequency offset adjustment and control module is configured to determine the frequency offset adjustment value for the voltage controlled oscillator by adjusting and controlling the combined frequency offset value in the following way:

$$\overline{\Delta f}_{VCO}^{cur} = \begin{cases} 0 & |\overline{\Delta f}^{cur}| \leq F \\ \alpha \overline{\Delta f}^{cur} & |\overline{\Delta f}^{cur}| > F, \text{ and} \\ & |\overline{\Delta f}^{cur} - \overline{\Delta f}^{pre}| \leq \kappa|\overline{\Delta f}^{pre}| ; \\ \overline{\Delta f}_{VCO}^{pre} + \beta(\overline{\Delta f}^{cur} - \overline{\Delta f}_{VCO}^{pre}) & |\overline{\Delta f}^{cur}| > F, \text{ and} \\ & |\overline{\Delta f}^{cur} - \overline{\Delta f}^{pre}| > \kappa|\overline{\Delta f}^{pre}| \end{cases}$$

wherein, $F, \alpha, \beta, \kappa$ represents an adjusting and controlling parameter, $\overline{\Delta f}^{cur}$ is a combined frequency offset value in a process of the current frequency offset adjustment, $\overline{\Delta f}^{pre}$ is a combined frequency offset value in a process of the previous frequency offset adjustment, $\overline{\Delta f}_{VCO}^{cur}$ is a frequency offset adjustment value for the voltage controlled oscillator in the process of the current frequency offset adjustment, and $\overline{\Delta f}_{VCO}^{pre}$ is a frequency offset adjustment value for the voltage controlled oscillator in the process of the previous frequency offset adjustment.

14. The apparatus according to claim 13, wherein,
the frequency offset adjustment and control module is configured to: determine the frequency offset adjustment value for the overall reception signals as $\overline{\Delta f}^{cur} - \overline{\Delta f}_{VCO}^{cur}$; and determine the frequency offset adjustment value for the reception signal of each path as $\Delta f_i - \overline{\Delta f}^{cur}$, wherein, $\Delta f_i$ is the frequency offset value of the reception signal of path i.

15. The apparatus according to claim 14,
further comprising a frequency offset compensation module, which is configured to perform a frequency offset compensation according to a phase angle corresponding to the frequency offset adjustment value determined by the frequency offset adjustment and control module and a coordinate rotation digital computer algorithm.

16. The apparatus according to claim 12, wherein,
the frequency offset adjustment and control module is configured to determine the frequency offset adjustment value for the voltage controlled oscillator by adjusting and controlling the combined frequency offset value in the following way:

$$\overline{\Delta f}_{VCO}^{cur} = \begin{cases} 0 & |\overline{\Delta f}^{cur}| \leq F \\ \alpha \overline{\Delta f}^{cur} & |\overline{\Delta f}^{cur}| > F, \text{ and} \\ & |\overline{\Delta f}^{cur} - \overline{\Delta f}^{pre}| \leq \kappa|\overline{\Delta f}^{pre}| ; \\ \overline{\Delta f}_{VCO}^{pre} + \beta(\overline{\Delta f}^{cur} - \overline{\Delta f}_{VCO}^{pre}) & |\overline{\Delta f}^{cur}| > F, \text{ and} \\ & |\overline{\Delta f}^{cur} - \overline{\Delta f}^{pre}| > \kappa|\overline{\Delta f}^{pre}| \end{cases}$$

wherein, $F, \alpha, \beta, \kappa$ represents an adjusting and controlling parameter, $\overline{\Delta f}^{cur}$ is a combined frequency offset value in a process of the current frequency offset adjustment, $\overline{\Delta f}^{pre}$ is a combined frequency offset value in a process of the previous frequency offset adjustment, $\overline{\Delta f}_{VCO}^{cur}$ is a frequency offset adjustment value for the voltage controlled oscillator in the process of the current frequency offset adjustment, and $\overline{\Delta f}_{VCO}^{pre}$ is a frequency offset adjustment value for the voltage controlled oscillator in the process of the previous frequency offset adjustment.

17. The apparatus according to claim 16, wherein,
the frequency offset adjustment and control module is configured to: determine the frequency offset adjustment value for the overall reception signals as $\overline{\Delta f}^{cur} - \overline{\Delta f}_{VCO}^{cur}$; and determine the frequency offset adjustment value for the reception signal of each path as $\overline{\Delta f_i} - \overline{\Delta f}^{cur}$, wherein, $\Delta f_i$ is the frequency offset value of the reception signal of path i.

18. The apparatus according to claim 17, further comprising a frequency offset compensation module, which is configured to perform a frequency offset compensation according to a phase angle corresponding to the frequency offset adjustment value determined by the frequency offset adjustment and control module and a coordinate rotation digital computer algorithm.

* * * * *